US012530804B2

(12) United States Patent
Watanabe et al.

(10) Patent No.: US 12,530,804 B2
(45) Date of Patent: Jan. 20, 2026

(54) MEASUREMENT DEVICE, MEASUREMENT SYSTEM, MEASUREMENT METHOD, AND COMPUTER PROGRAM PRODUCT

(71) Applicant: KABUSHIKI KAISHA TOSHIBA, Tokyo (JP)

(72) Inventors: Tomoki Watanabe, Tokyo (JP); Akihito Seki, Yokohama Kanagawa (JP)

(73) Assignee: KABUSHIKI KAISHA TOSHIBA, Kawasaki (JP)

(*) Notice: Subject to any disclaimer, the term of this patent is extended or adjusted under 35 U.S.C. 154(b) by 457 days.

(21) Appl. No.: 17/897,100

(22) Filed: Aug. 26, 2022

(65) Prior Publication Data
US 2023/0137094 A1    May 4, 2023

(30) Foreign Application Priority Data
Oct. 29, 2021    (JP) .................................. 2021-177099

(51) Int. Cl.
*G06T 7/00* (2017.01)
*G06T 7/55* (2017.01)
*G06T 7/80* (2017.01)

(52) U.S. Cl.
CPC .................. *G06T 7/97* (2017.01); *G06T 7/55* (2017.01); *G06T 7/80* (2017.01); *G06T 2207/30184* (2013.01)

(58) Field of Classification Search
None
See application file for complete search history.

(56) References Cited

U.S. PATENT DOCUMENTS

| | | | |
|---|---|---|---|
| 10,914,840 B2 | 2/2021 | Sugiura et al. | |
| 2012/0081574 A1* | 4/2012 | Kawakami | H04N 5/772 348/E5.031 |
| 2015/0133146 A1 | 5/2015 | Mcclendon | |
| 2015/0134689 A1 | 5/2015 | Mcclendon | |
| 2015/0134690 A1 | 5/2015 | Mcclendon | |
| 2020/0013188 A1* | 1/2020 | Nakashima | G06N 3/045 |
| 2020/0175765 A1 | 6/2020 | Mcadam et al. | |

(Continued)

FOREIGN PATENT DOCUMENTS

| | | |
|---|---|---|
| CN | 110263800 A | 9/2019 |
| JP | 2020008984 A | 1/2020 |

(Continued)

OTHER PUBLICATIONS

Positioning Method Using Camera Phone in a Pedestrian Navigation System. Nakaguchi et al. (Year: 2006).*

(Continued)

*Primary Examiner* — Delomia L Gilliard
(74) *Attorney, Agent, or Firm* — Holtz, Holtz & Volek PC

(57) ABSTRACT

A measurement device of an embodiment includes an imaging unit, an acquisition unit, an output control unit, and an input unit. The imaging unit captures a first image. The acquisition unit acquires auxiliary information candidates for assisting in estimating the captured location of the first image based on the first image. The output control unit outputs the auxiliary information candidates to an output unit. The input unit receives input to select auxiliary information from the auxiliary information candidates.

11 Claims, 5 Drawing Sheets

(56) References Cited

U.S. PATENT DOCUMENTS

| | | | |
|---|---|---|---|
| 2020/0292704 A1* | 9/2020 | Sugiura | G01S 17/89 |
| 2021/0279908 A1* | 9/2021 | Nakashima | G06T 7/74 |
| 2022/0215576 A1* | 7/2022 | Sano | G06T 7/579 |

FOREIGN PATENT DOCUMENTS

| | | |
|---|---|---|
| JP | 6727032 B2 | 7/2020 |
| JP | 2020177567 A | 10/2020 |
| JP | 2021140317 A | 9/2021 |

OTHER PUBLICATIONS

Japanese Office Action (and an English language translation thereof) dated Jan. 7, 2025, issued in counterpart Japanese Application No. 2021-177099.

Nakaguchi, et al., "Positioning Method Using Camera Phone in a Pedestrian Navigation System", IEICE Technical Report, Japan, the Institute of Electronics, Information and Communication Engineers, Mar. 21, 2006, the 105th volume, No. 688, pp. 25-30.

Japanese Decision to Grant a Patent (and an English language translation thereof) dated May 27, 2025, issued in counterpart Japanese Application No. 2021-177099.

\* cited by examiner

MEASUREMENT DEVICE, MEASUREMENT SYSTEM, MEASUREMENT METHOD, AND COMPUTER PROGRAM PRODUCT

CROSS-REFERENCE TO RELATED APPLICATIONS

This application is based upon and claims the benefit of priority from Japanese Patent Application No. 2021-177099, filed on Oct. 29, 2021; the entire contents of which are incorporated herein by reference.

FIELD

Embodiments described herein relate generally to a measurement device, a measurement system, a measurement method, and a computer program product.

BACKGROUND

In inspection work, for example, for the purpose of maintenance and management of a facility, an inspection worker (hereinafter referred to as a user) captures images of inspection locations with a mobile terminal and stores the images together with location information on where the images are captured. With conventional techniques, however, it has been difficult to uniquely estimate the captured location from the captured image.

DETAILED DESCRIPTION

A measurement device according to an embodiment includes one or more hardware processors configured to function as an imaging unit, an acquisition unit, an output control unit, and an input unit. The imaging unit is configured to capture a first image. The acquisition unit is configured to acquire auxiliary information candidates for assisting in estimating a captured location of the first image based on the first image. The output control unit is configured to output the auxiliary information candidates to an output unit. The input unit is configured to receive input to select auxiliary information from the auxiliary information candidates.

With reference to the accompanying drawings, the following describes embodiments of a measurement device, a measurement system, a measurement method, and a computer program product in detail.

First Embodiment

First, the measurement device of a first embodiment will be described. In the first embodiment, the case in which the measurement device is a measurement terminal held by a user is described as an example.

Example of Functional Configuration

Figure 1:
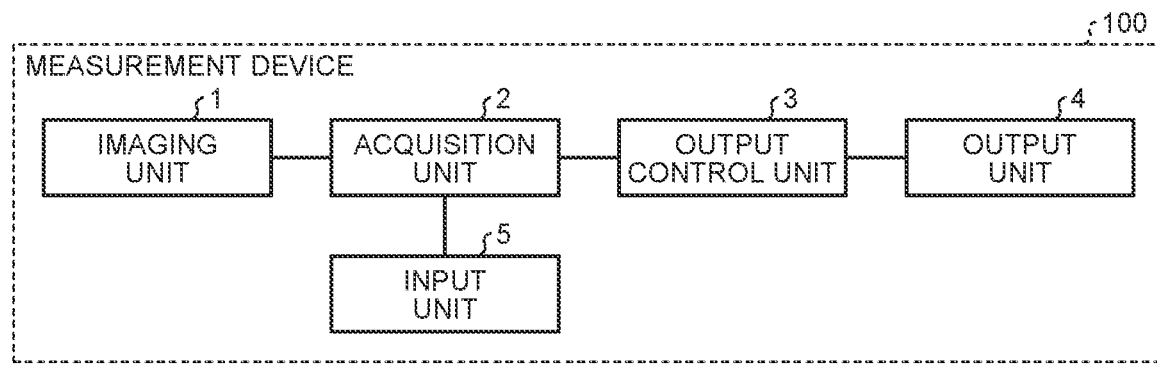
FIG. 1 is a diagram illustrating an example of a functional configuration of a measurement device according to a first embodiment.

FIG. 1 is a diagram illustrating an example of a functional configuration of a measurement device 100 of the first embodiment. The measurement device 100 of the first embodiment includes an imaging unit 1, an acquisition unit 2, an output control unit 3, an output unit 4, and an input unit 5.

The imaging unit 1 captures a first image. The imaging unit 1 may be built into the measurement device 100 or attached externally to the user's hard hat, chest belt, and the like, for example.

The acquisition unit 2 acquires auxiliary information candidates that assist in identifying the captured location of the first image based on the first image. For example, the acquisition unit 2 acquires auxiliary information candidates generated based on at least one of the relative position between a candidate of the captured location of the first image and an auxiliary information candidate, and the relative angle between the location of the first image as viewed from the candidate of the captured location and the location of the auxiliary information candidate as viewed from the candidate of the captured location. Specifically, the acquisition unit 2 acquires the auxiliary information candidates for which the relevant relative position is smaller than a threshold and for which the relevant relative angle is different, for example. The acquisition unit 2 acquires the auxiliary information candidates from a server device, for example. The configuration including the server device will be described later in a second embodiment.

The auxiliary information candidate includes additional information used to identify the captured location when the server device is unable to uniquely identify the captured location of the first image and when there are a plurality of candidates of the captured location. The auxiliary information candidate includes at least one of a second image representing scenery in the vicinity of the candidate of the captured location, computer graphics (CG) representing the scenery in the relevant vicinity, and text describing the scenery in the relevant vicinity, for example.

Figure 2:
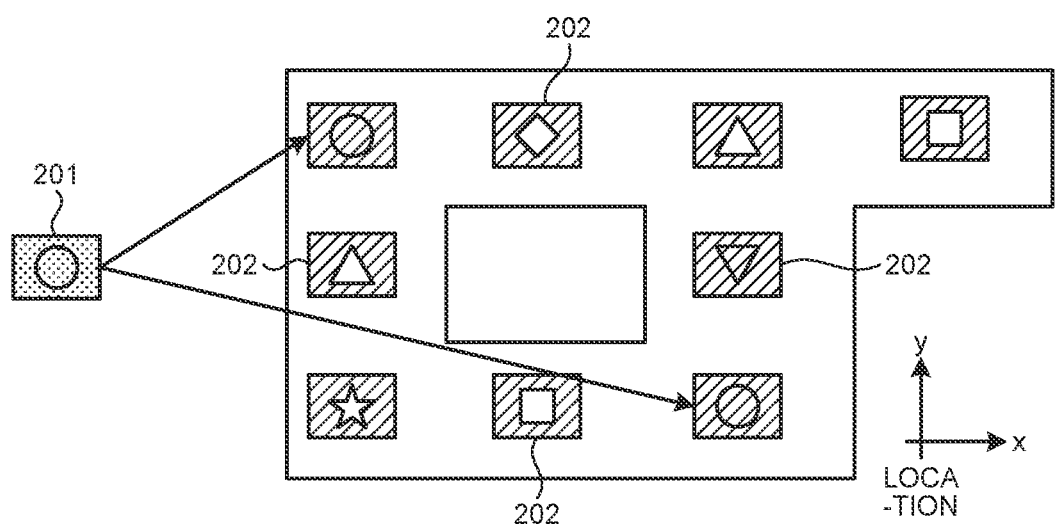
FIG. 2 is a diagram illustrating an example of a case in which it is not possible to uniquely identify a captured location of a first image.

FIG. 2 is a diagram illustrating an example of a case in which it is not possible to uniquely identify the captured location of a first image 201. The example in FIG. 2 illustrates a case in which there are two candidates for the captured location of the first image 201. For example, the auxiliary information candidate includes information indicating the candidate of the captured location of the first image or scenery information representing the scenery visible from the vicinity (surroundings) of the relevant candidate. For example, the scenery information is a past image captured in advance (second image 202).

Furthermore, the auxiliary information candidate may also include location information corresponding to the scenery information. For example, the location information corresponding to the scenery information is the latitude, longitude, and azimuth at which the second image 202 was captured. For example, the location information corresponding to the scenery information is the relative distance, direction, and the like with reference to a certain location.

Returning to FIG. 1, the output control unit 3 outputs output information including the auxiliary information candidates to the output unit 4. For example, the output unit 4 is a display that outputs the second images 202 included in the auxiliary information candidates. For example, if the auxiliary information candidate includes the location information, the output unit 4 is a display that displays the relevant location information and a speaker or the like that audibly outputs the relevant location information.

The output control unit 3 may also output the information indicating the relative position between the candidate of the captured location of the first image 201 and the location of the auxiliary information candidate to the output unit 4. Specifically, when the output unit 4 is a display device such as a display, the information indicating the relative position is at least one of a numerical value indicating the relative position, an arrow indicating the relative position, and a display position of the auxiliary information candidate to be displayed on the display device. The numerical value indicating the relative position is, for example, a numerical value indicating the relative position to the candidate of the captured location, the distance from the candidate of the captured location, the direction from the candidate of the captured location, and the like.

The input unit 5 receives input to select auxiliary information from the auxiliary information candidates. The auxiliary information is transmitted, for example, to the server device and used in an estimation process of the captured location of the first image 201. The output control unit 3 outputs the captured position of the first image 201 estimated based on at least one of the first image 201 and the auxiliary information to the output unit 4.

Example of Output Information

Figure 3:
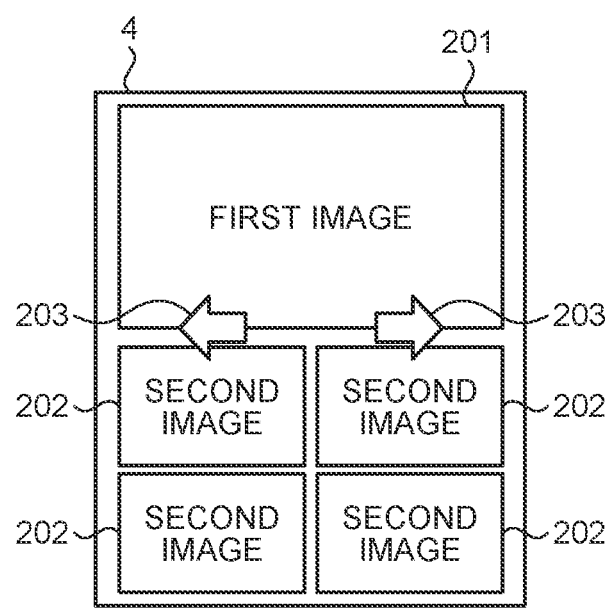
FIG. 3 is a diagram illustrating a first example of output information in the first embodiment.

FIG. 3 is a diagram illustrating a first example of the output information in the first embodiment. The example in FIG. 3 illustrates an example of presenting auxiliary information candidates with the second images 202 when the output unit 4 is a display. The output control unit 3 outputs at least the second images 202 to the output unit 4. Furthermore, the output control unit 3 may also, as illustrated in FIG. 3, output the first image 201 to the output unit 4.

The output control unit 3 may also present the location information corresponding to the second image 202. For example, the output control unit 3 may present a right-pointing arrow 203 when the location information on the second image 202 indicates the right side of the candidate of the captured location or present a left-pointing arrow 203 when the location information on the second image 202 indicates the left side of the candidate of the captured location. Furthermore, for example, the output control unit 3 may place the second image 202 on the right side when the location information on the second image 202 indicates the right side of the candidate of the captured location or place the second image 202 on the left side when the location information on the second image 202 indicates the left side of the candidate of the captured location.

The auxiliary information candidates may be meta-information representing the type, color, shape, location, and the like of landmarks such as steel towers, signals, police stations, hospitals, or the like. The meta-information may be created by humans, extracted automatically from already existing maps, or generated automatically using an image recognition technology from images captured in advance. In this case, the output control unit 3 converts the meta-information into text, synthesized sound, synthesized images, and the like and outputs them to the output unit 4.

The output control unit 3 may output both the second image 202 and the meta-information to the output unit 4.

Figure 4:
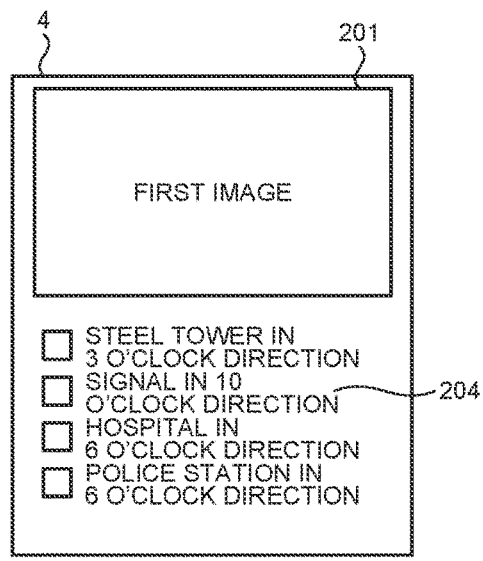
FIG. 4 is a diagram illustrating a second example of the output information in the first embodiment.

FIG. 4 is a diagram illustrating a second example of the output information in the first embodiment. The example in FIG. 4 illustrates an example of presenting auxiliary information candidates in text 204 when the output unit 4 is a display. The input unit 5 receives input to select auxiliary information from the auxiliary information candidates represented by the text 204. In the example in FIG. 4, for example, when there is a steel tower in the 3 o'clock direction and a hospital in the 6 o'clock direction, the user provides input to select the checkbox of "Steel Tower in 3 O'clock Direction" and the checkbox of "Hospital in 6 O'clock Direction".

Figure 5:
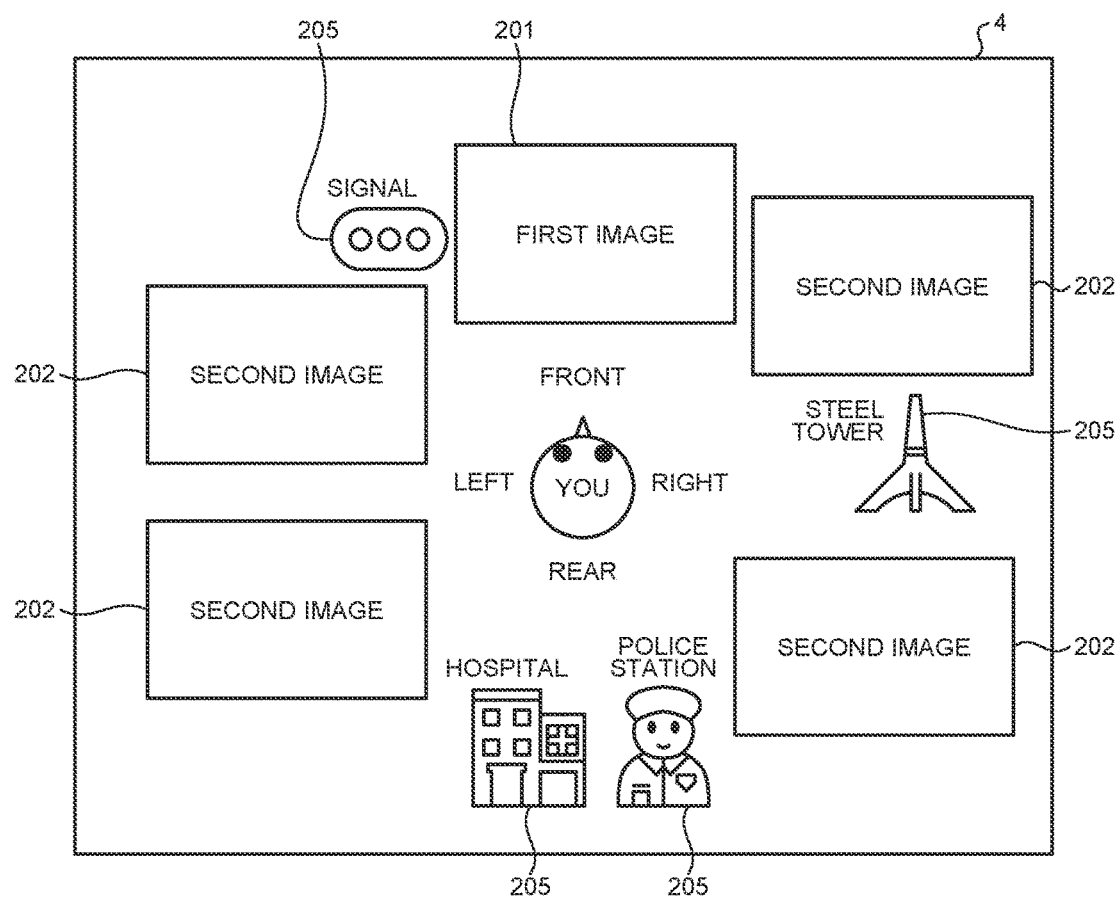
FIG. 5 is a diagram illustrating a third example of the output information in the first embodiment.

FIG. 5 is a diagram illustrating a third example of the output information in the first embodiment. The example in FIG. 5 illustrates an example of presenting auxiliary information candidates with the first image 201, the second images 202, and meta-information 205 when the output unit 4 is a display. The output control unit 3 determines the display position of the second image 202 based on the location information on the second image 202. The output control unit 3 presents the meta-information 205 represented by text, icons, and the like at the display position based on the location information on the relevant meta-information 205.

When the second image 202 is used, it has the advantage in that it is possible to present scenery even if the scenery is difficult to classify or express by text or the like. Meanwhile, when the meta-information is used, it has the advantage in that it is possible to present auxiliary information candidates with a smaller amount of data compared to images.

The input unit 5 acquires auxiliary information effective for estimating the captured location of the first image 201 based on the user's operating input.

The user is assumed to act based on the auxiliary information candidates acquired by the acquisition unit 2. The auxiliary information acquired by the input unit 5 is the information related to at least one of the auxiliary information candidates. For example, there are two broadly divided methods of acquiring auxiliary information.

The first acquisition method is for the input unit 5 to receive an input indicating whether each of the auxiliary information candidates presented by the output unit 4 exists at the presented location at a location where the first image 201 was captured at which the user is currently located. The auxiliary information resulting from this acquisition method is binary flag information on the existence or non-existence of each of the auxiliary information candidates, for example. In the actual operation, a case in which it is difficult to confirm the existence or non-existence can be assumed, so it may be flag information in three values of existence, non-existence, and unknown.

The second acquisition method is to assume, as auxiliary information, a third image associated with at least one of the auxiliary information candidates presented by the output unit 4, by capturing it by the imaging unit 1. For example, when the auxiliary information is the second image 202, the third image is an image captured by the user in a composition similar to that of the second image 202, and when the auxiliary information is the meta-information 205, the third image is an image in which the landmark indicated by the meta-information 205 is captured.

Specifically, the output control unit 3 outputs the information requesting the user to capture images of the auxiliary information that, out of the auxiliary information candidates, can be captured from the user's location to the output unit 4. Then, the imaging unit 1 captures, as auxiliary information to be added by the user, the third image including the scenery in the direction of any of the auxiliary information. This allows the information on selecting auxiliary information indirectly to be acquired, through the image-capturing operation that the user was performing originally, without causing the user to operate to select the auxiliary information explicitly.

Alternatively, the input unit 5 receives input of selecting auxiliary information (for example, landmark and the like) from the auxiliary information candidates. Next, the output control unit 3 outputs the information for which capturing images in the direction of the selected auxiliary information is asked to the output unit 4. Then, the imaging unit 1 captures, as auxiliary information to be added by the user, the third image that includes the scenery in the direction of the selected auxiliary information.

Moreover, the above-described two acquisition methods of acquiring auxiliary information by an image capturing operation performed by the user and acquiring auxiliary information by selection may be used in combination.

That is, the auxiliary information acquired by the second acquisition method is image information. The auxiliary information may include the relative change between the captured location of the first image 201 and the captured location of the third image. The relative change may be acquired using, for example, a position sensor and an acceleration sensor mounted on a camera (imaging unit 1) or may be calculated from the time-series variation in the images obtained by the sensor of the camera.

Example of Measurement Method

Figure 6:
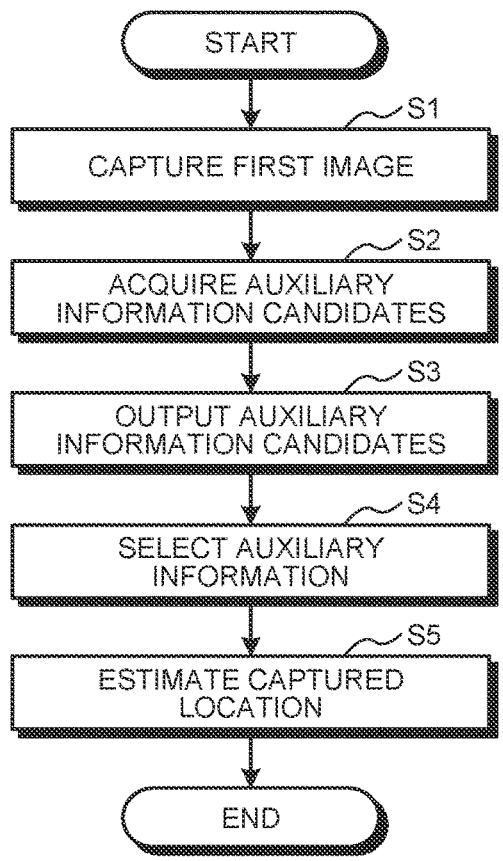
FIG. 6 is a flowchart illustrating an example of a measurement method in the first embodiment.

FIG. 6 is a flowchart illustrating an example of a measurement method in the first embodiment. First, the imaging unit 1 captures the first image 201 (step S1). Next, the acquisition unit 2 acquires auxiliary information candidates for assisting in identifying the captured location of the first image 201 based on the first image 201 (step S2). Then, the output control unit 3 outputs (displays) the auxiliary information candidates acquired at step S2 to the output unit 4 (step S3). Next, the input unit 5 receives input to select auxiliary information from the auxiliary information candidates that have been output at step S3 (step S4).

Then, the server device receives the auxiliary information that has been input at step S4 from the measurement device 100 and estimates the captured location of the first image 201 based on at least one of the relevant auxiliary information and the first image 201 (step S5).

As described in the foregoing, according to the measurement device 100 of the first embodiment, the captured location can be uniquely estimated from the captured image (in the first embodiment, the first image 201). Furthermore, the measurement device 100 of the first embodiment can efficiently acquire, by acquiring the first image 201 and auxiliary information, the information used to uniquely estimate the captured location of the first image 201. For example, the measurement device 100 of the first embodiment can uniquely estimate the captured location, even when it is not possible to uniquely identify the captured location from the information in the first image 201, by instructing the user to perform simple operations and obtaining additional information (auxiliary information).

Conventionally, an image has been assumed to contain, for example, a character string that uniquely identifies the captured location (for example, a place name and the like included in a traffic sign or the like), and when the image does not contain such a character string, it has been not possible to check the relevant character string against the map database and estimate the captured location from the image.

Second Embodiment

A second embodiment will be described next. In the description of the second embodiment, similar explanations to those of the first embodiment will be omitted and the portions that differ from the first embodiment will be described.

Example of Functional Configuration

Figure 7:
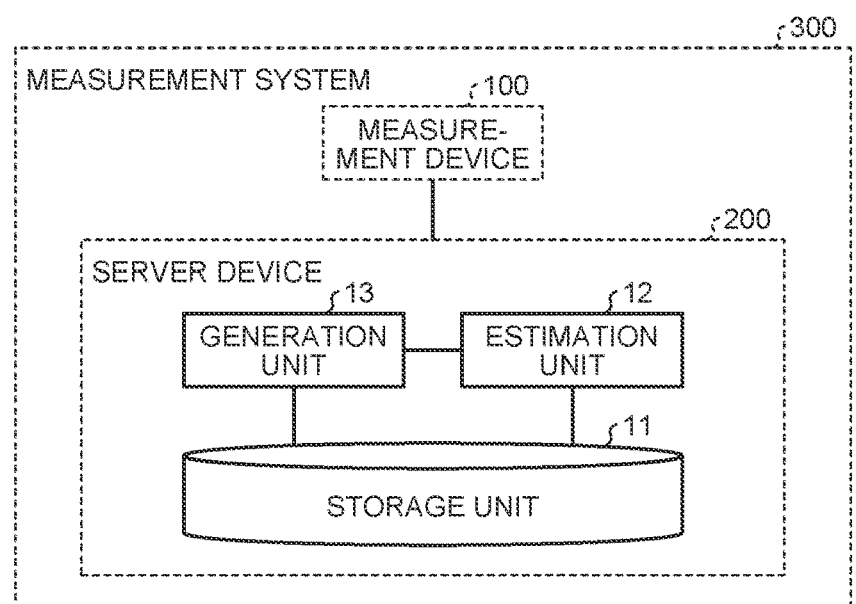
FIG. 7 is a diagram illustrating an example of a functional configuration of a measurement system according to a second embodiment.

FIG. 7 is a diagram illustrating an example of a functional configuration of a measurement system 300 of the second embodiment. The measurement system 300 of the second embodiment includes the measurement device 100 and a server device 200. The functional configuration of the measurement device 100 in the second embodiment is the same as that of the first embodiment, so the description is omitted.

The server device 200 of the second embodiment includes a storage unit 11, an estimation unit 12, and a generation unit 13.

The measurement device 100 and the server device 200 are connected by a certain communication means. The communication means is a wireless connection such as Wi-Fi (registered trademark) and mobile networks, or a wired connection such as Ethernet (registered trademark), for example.

The storage unit 11 stores therein a database and the like that holds information used in the estimation of the captured location of the first image 201 and in the generation of the above-described auxiliary information candidates. Examples of the information stored in this database include the above-described scenery information, the above-described meta-information (for example, information indicating landmarks and the like), and the location information on the scenery information and the meta-information.

The estimation unit 12 estimates the captured location of the first image, based on at least one of the first image 201 and the above-described auxiliary information.

For example, the estimation unit 12 estimates the captured location, based on the location, appearance, and the like of the object captured in the first image 201. The estimation unit 12 utilizes the information stored in the storage unit 11 in advance for estimating the captured location. At this time, there are cases in which the captured location can be uniquely estimated and in which a plurality of candidates of the captured location that are equally certain are estimated (see above-described FIG. 2).

For example, when there are two buildings of exactly the same shape, it is not possible to distinguish which house has been captured from an image for which only that building was captured. In this case, if the shape of the neighboring building is different, then when the information about the neighboring building (scenery information) is available as auxiliary information, it is possible to identify which house the image was captured of. The auxiliary information is an image captured from the candidate of the captured location in a direction different from the first image 201, and location information and the like on landmarks around the candidate of the captured location.

The generation unit 13 generates the above-described auxiliary information candidates using the first image 201 and the information in the storage unit 11. For example, the generation unit 13 generates auxiliary information that can be acquired around the candidates of the captured location estimated by the estimation unit 12 for each candidate of the captured location. The generation unit 13 reads out, from the storage unit 11 that is used by the estimation unit 12, the second images 202 captured in the past in the vicinity of each of the candidates of the captured location, and the meta-information and the like indicating landmarks.

At this time, if there are too many auxiliary information candidates, the user takes time for checking. Therefore, the generation unit 13 may perform a sorting process to sort auxiliary information candidates that are more effective in estimating the captured location.

For example, because landmarks that are too far from the candidate of the captured location are not likely to be identified, the sorting process may include excluding the landmarks that are too far from the candidate of the captured location. Furthermore, for example, because one similar landmark in a similar direction and distance from the candidate of the captured location is only needed, the sorting process may include extracting only one similar landmark in a similar direction and distance from the candidates of the captured location. For example, because landmarks that commonly exist at similar locations in a plurality of candidates of the captured location do not contribute to location estimation, the sorting process may include excluding the landmarks that commonly exist at similar locations in the candidates of the captured location.

When the estimation unit 12 estimates the captured location using the first image 201 and auxiliary information, it is not always possible to uniquely estimate the captured location if the auxiliary information is not sufficient. In this case, the process of generating auxiliary information candidates by the generation unit 13 and acquiring auxiliary information may be repeated a plurality of times. In this case, by narrowing down the candidates of the captured location of the first image 201 using the selected auxiliary information, the estimation unit 12 updates the candidates of the captured location of the first image 201. Next, the generation unit 13 updates the auxiliary information candidates, based on the updated candidates of the captured location of the first image 201. Then, the acquisition unit 2 acquires the updated auxiliary information candidates. Next, the output control unit 3 outputs the updated auxiliary information candidates to the output unit 4. Then, the input unit 5 receives input to select auxiliary information from the updated auxiliary information candidates.

As in the foregoing, according to the measurement system 300 of the second embodiment, it is possible to efficiently acquire auxiliary information for uniquely estimating the captured location from the measurement device 100 and uniquely identify the captured location of the first image 201.

Third Embodiment

Figure 8:
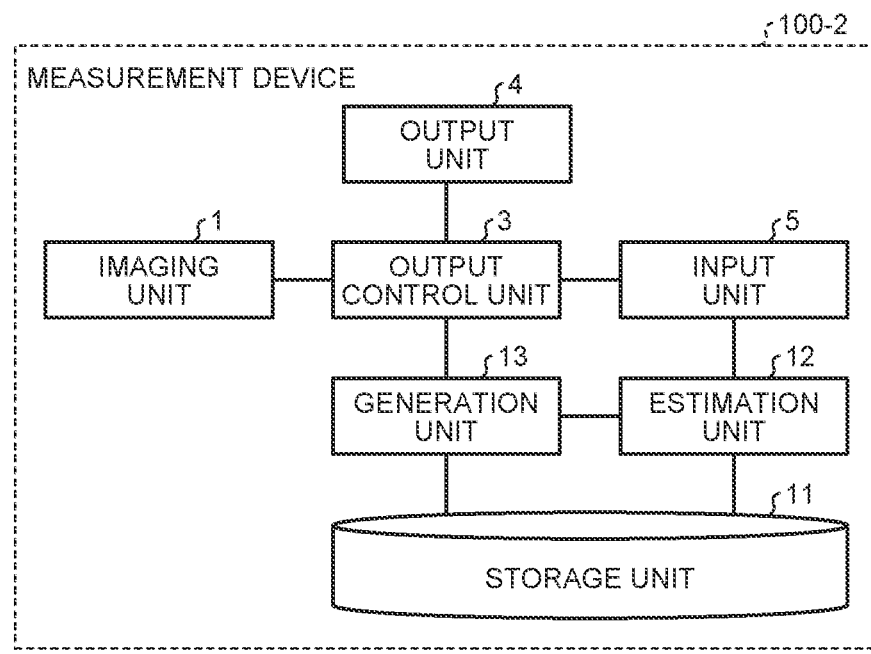
FIG. 8 is a diagram illustrating an example of a functional configuration of a measurement device according to a third embodiment.

Next, a third embodiment will be described. In the description of the third embodiment, descriptions similar to those of the second embodiment will be omitted and the portions that differ from the first embodiment will be described.
Example of Functional Configuration FIG. 8 is a diagram illustrating an example of a functional configuration of a measurement device 100-2 of the third embodiment. The measurement device 100-2 of the third embodiment is provided with the imaging unit 1, the acquisition unit 2, the output control unit 3, the output unit 4, the input unit 5, the storage unit 11, the estimation unit 12, and the generation unit 13.

The descriptions of the imaging unit 1, the acquisition unit 2, the output control unit 3, the output unit 4, the input unit 5, the storage unit 11, the estimation unit 12, and the generation unit 13 are the same as those of the first and the second embodiments, and their descriptions are therefore omitted.

According to the measurement device 100-2 of the third embodiment, it is possible to uniquely identify the captured location of the first image 201 by efficiently acquiring auxiliary information for uniquely estimating the captured location, singly without performing communication with an external device.

Figure 9:
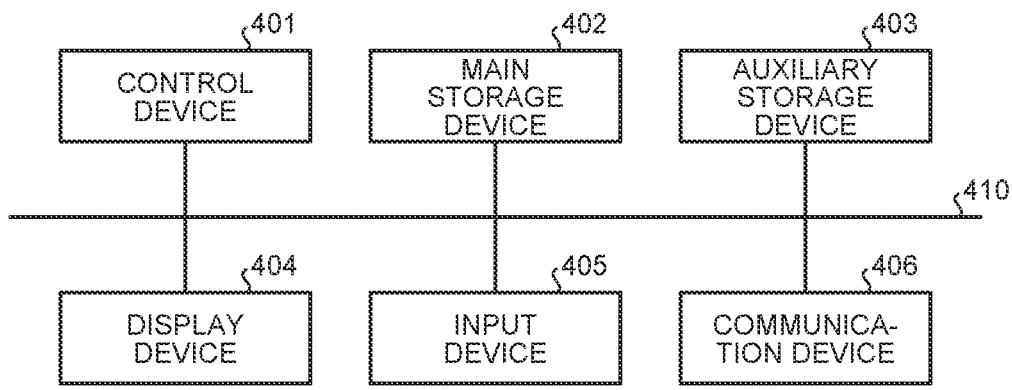
FIG. 9 is a diagram illustrating an example of a hardware configuration of the respective devices of the first to the third embodiments.

Lastly, an example of the hardware configuration of each of the devices in the first through the third embodiments will be described.
Example of Hardware Configuration FIG. 9 is a diagram illustrating a hardware configuration of the respective devices (measurement device 100 (100-2) and server device 200) of the first to the third embodiments.

Each device includes a control device 401, a main storage device 402, an auxiliary storage device 403, a display device 404, an input device 405, and a communication device 406. The control device 401, the main storage device 402, the auxiliary storage device 403, the display device 404, the input device 405, and the communication device 406 are connected via a bus 410.

The control device 401 executes a program read from the auxiliary storage device 403 to the main storage device 402. The main storage device 402 is a memory such as a read-only memory (ROM) and a random access memory (RAM). The auxiliary storage device 403 is a hard disk drive (HDD), a solid-state drive (SSD), a memory card, or the like.

The display device 404 displays display information. The display device 404 is a liquid crystal display or the like, for example. The input device 405 is an interface for receiving input of information. The input device 405 is a keyboard, a mouse, or the like, for example. If the device is a smart device, such as a smartphone, a tablet device, and the like, the display device 404 and the input device 405 are a touch panel, for example. The display function and input function of an external device connected via the communication device 406 may be utilized, without being provided with the display device 404 and the input device 405. The communication device 406 is an interface for performing communication with other devices.

The program to be executed on each device is provided as a computer program product recorded on a computer-readable storage medium such as a CD-ROM, a memory card, a CD-R, and a digital versatile disc (DVD) in an installable or executable format file.

The program to be executed by each device may be configured to be stored on a computer connected to a network such as the Internet and to be provided by having the program downloaded via the network. The program to be executed by each device may be configured to be provided via a network such as the Internet without having the program downloaded.

The program to be executed by each device may be configured to be provided being embedded in a ROM and the like in advance.

The program to be executed by each device has a modular configuration that includes functional blocks that can also be implemented by the program among the functional configurations (functional blocks) of each device. Each of the relevant functional blocks, as actual hardware, is loaded onto the main storage device 402, as the control device 401 reads the program from the storage medium and executes it. That is, each of the above-described functional blocks is generated on the main storage device 402.

Some or all of the above-described functional blocks may be implemented by hardware such as integrated circuits (ICs) instead of being implemented by software.

When a plurality of processors are used to implement each of the functional blocks, each processor may implement one of the functional blocks or two or more of the functional blocks.

The operation mode of the computer that implements each device may be in any desired mode. For example, the server device 200 may be operated as a cloud system on a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A measurement device comprising:
   one or more hardware processors configured to:
      capture a first image;
      acquire auxiliary information candidates for assisting in estimating a captured location of the first image based on the first image;
      output the auxiliary information candidates to a display device;
      receive input to select auxiliary information from the auxiliary information candidates;
      output information requesting to capture an image in a direction of the auxiliary information, to the display device;
      capture a third image including scenery in the direction of the auxiliary information, as auxiliary information to be added by a user; and
      output a captured location of the first image that is estimated based on at least one of the first image and the auxiliary information to the display device.

2. The measurement device according to claim 1, wherein each of the auxiliary information candidates includes at least one of a second image representing scenery in a vicinity of a candidate of the captured location, computer graphics (CG) representing the scenery in the vicinity, and text describing the scenery in the vicinity.

3. The measurement device according to claim 1, wherein the one or more hardware processors output information indicating a relative position between a candidate of the captured location of the first image and a location of an auxiliary information candidate, to the display device.

4. The measurement device according to claim 3, wherein the information indicating the relative position is at least one of a numerical value indicating the relative position, an arrow indicating the relative position, and a display position of the auxiliary information candidate to be displayed on the display device.

5. The measurement device according to claim 1, wherein the one or more hardware processors acquire the auxiliary information candidates generated based on at least one of a relative position between a candidate of the captured location of the first image and the auxiliary information candidate, and a relative angle between a location of the first image as viewed from the candidate of the captured location and a location of the auxiliary information candidate as viewed from the candidate of the captured location.

6. The measurement device according to claim 5, wherein the one or more hardware processors acquire the auxiliary information candidate for which the relative position is smaller than a threshold and for which the relative angle is different.

7. The measurement device according to claim 1, wherein the one or more hardware processors are further configured to:
   generate the auxiliary information candidates; and
   estimate the captured location of the first image, based on at least one of the first image and the auxiliary information.

8. The measurement device according to claim 7, wherein the one or more hardware processors:
   update candidates of the captured location of the first image by narrowing down the candidates of the captured location of the first image using the auxiliary information selected,
   update the auxiliary information candidates based on the updated candidates of the captured location of the first image,
   acquire the updated auxiliary information candidates,
   output the updated auxiliary information candidates to the display device, and
   receive input to select the auxiliary information from the updated auxiliary information candidates.

9. A measurement system comprising:
   a measurement device; and
   a server device,
   wherein:
   the measurement device comprises:
      one or more first hardware processors configured to:
         capture a first image,
         acquire auxiliary information candidates for assisting in estimating a captured location of the first image based on the first image,
         output the auxiliary information candidates to a display device,
         receive input to select auxiliary information from the auxiliary information candidates,
         output information requesting to capture an image in a direction of the auxiliary information, to the display device,
         capture a third image including scenery in the direction of the auxiliary information, as auxiliary information to be added by a user, and
         output a captured location of the first image that is estimated based on at least one of the first image and the auxiliary information to the display device, and
   the server device comprises:
      one or more second hardware processors configured to:
         generate the auxiliary information candidates based on the first image, and
         estimate the captured location of the first image based on at least one of the first image and the auxiliary information.

10. A measurement method comprising:
    capturing, by a measurement device, a first image;

acquiring, by the measurement device, auxiliary information candidates for assisting in estimating a captured location of the first image based on the first image;

outputting, by the measurement device, the auxiliary information candidates to a display device;

receiving, by the measurement device, input to select auxiliary information from the auxiliary information candidates;

outputting, by the measurement device, information requesting to capture an image in a direction of the auxiliary information, to the display device;

capturing, by the measurement device, a third image including scenery in the direction of the auxiliary information, as auxiliary information to be added by a user; and outputting, by the measurement device, a captured location of the first image that is estimated based on at least one of the first image and the auxiliary information to the display device.

11. A computer program product having a non-transitory computer-readable medium including programmed instructions stored therein, wherein the instructions, when executed by a computer, cause the computer to:

capture a first image;

acquire auxiliary information candidates for assisting in estimating a captured location of the first image based on the first image;

output the auxiliary information candidates to a display device;

receive input to select auxiliary information from the auxiliary information candidates;

output information requesting to capture an image in a direction of the auxiliary information, to the display device;

capture a third image including scenery in the direction of the auxiliary information, as auxiliary information to be added by a user; and output a captured location of the first image that is estimated based on at least one of the first image and the auxiliary information to the display device.

\* \* \* \* \*